May 26, 1964
D. LABINO
3,134,659
GLASS MELTING APPARATUS AND METHOD USEFUL FOR
THE PRODUCTION OF GLASS FIBERS
Original Filed April 23, 1957
2 Sheets-Sheet 1
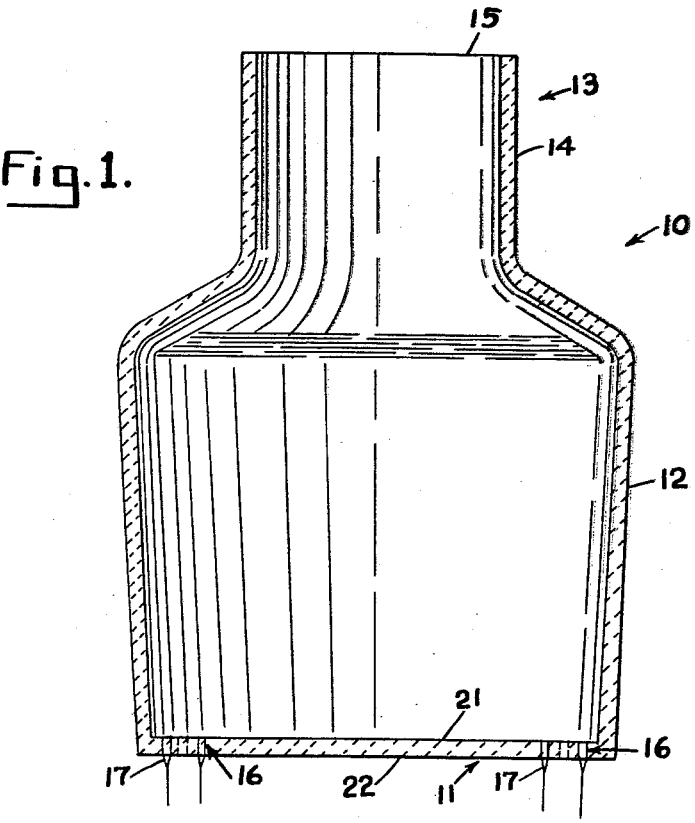
Fig.1.
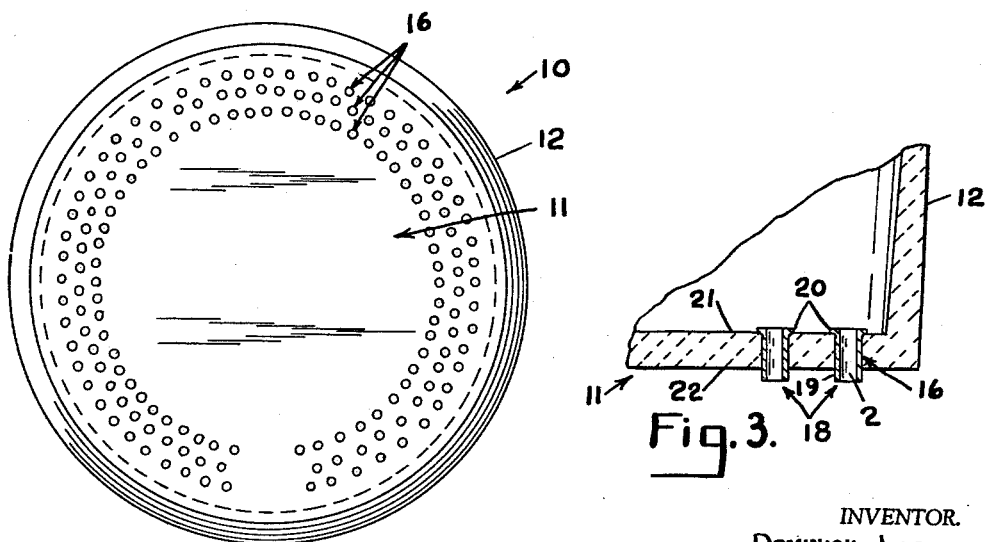
Fig. 2.
Fig. 3.
INVENTOR.
DOMINICK LABINO
BY *John A. McKinney*
ATTORNEY

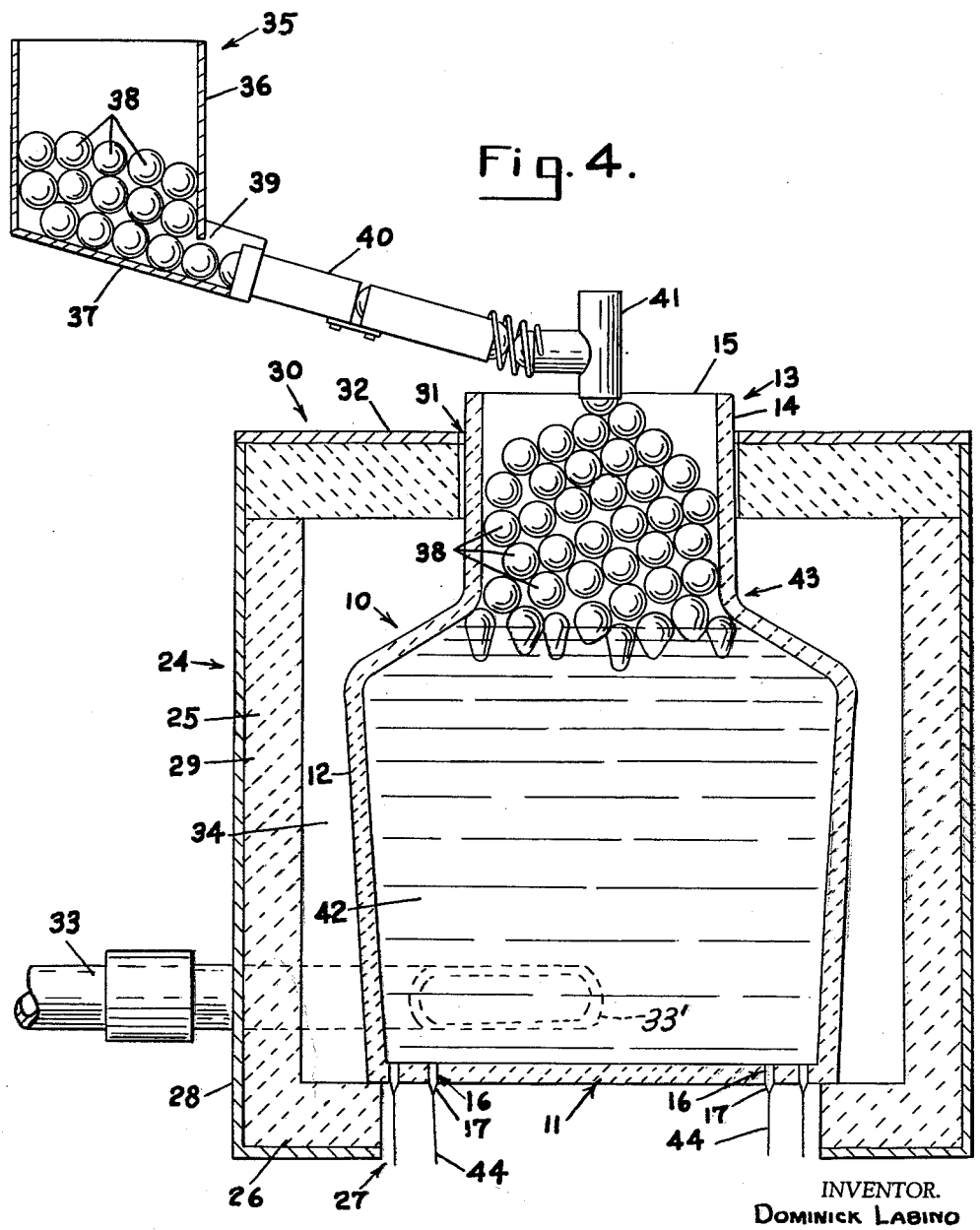

United States Patent Office 3,134,659
Patented May 26, 1964

3,134,659
GLASS MELTING APPARATUS AND METHOD USEFUL FOR THE PRODUCTION OF GLASS FIBERS
Dominick Labino, Grand Rapids, Ohio, assignor to Johns-Manville Corporation, New York, N.Y., a corporation of New York
Continuation of application Ser. No. 654,500, April 23, 1957. This application Aug. 24, 1959, Ser. No. 835,652
4 Claims. (Cl. 65—2)

This invention relates to method and apparatus for glass melting and more particularly relates to a one-piece melting chamber made of refractory material for melting glass preparatory to exuding into glass fibers.

This invention further relates to glass melting apparatus in which a glass melting chamber is positioned within an outer casing and in which the melting chamber has a configuration which defines with the outer casing a heating chamber having a preferred cross-section to conserve and fully utilize the heat furnished to the melting chamber, particularly by hot products of combustion.

This invention is still further related to glass melting apparatus in which a glass melting chamber, cooperatively positioned in respect to a gravity feeder, has an inlet throat portion which forms an automatic metering device for the raw glass, as well as cooperating in the function referred to in the preceding paragraph.

This application is a continuation of my copending application, Serial No. 654,500, filed April 23, 1957, now abandoned.

In the heating and melting of raw glass, in large tank type installations, it is common to impinge hot gases over the molten surface to provide sufficient heat for melting additional glass. Such arrangements, however, are not satisfactory for the heating and melting of raw glass, preparatory to exuding into glass fibers, in small crucibles for the impingement would unduly agitate the molten pool. Some hot gases would also contaminate the glass.

Since glass fibers are attenuated through a plurality of adjacent orifices, the problem of uniform heat distribution is more critical in forming glass fibers than it is in discharging a globule of glass through a single aperture into a mold.

Thus it becomes apparent that while gases, in the form of hot products of combustion, have been heretofore employed in melting glass prior to molding, problems differing not only in degree but in kind are encountered in attempting to melt raw glass in relatively small chambers, prior to attenuation into fine filaments.

In the production of glass fibers it is also customary to melt small quantities of glass in a small melting chamber to provide close control of the process of melting. Heretofore the melting chambers have generally been fabricated of a precious metal alloy, such as an alloy of platinum and rhodium. However, due to the limited supply of platinum metal and the highly skilled techniques required in rolling and fabricating the metal to prevent defects in the structure thereof, such prior melting chambers have been extremely expensive.

Therefore, it is an object of this invention to provide new and improved apparatus for melting glass, prior to attenuation into fibers, wherein the glass is heated by products of combustion without contamination or agitation.

Another object of this invention is to provide an arrangement wherein the gases employed to melt glass within a melting receptacle are employed to preheat the raw glass in the same receptacle.

A further object of this invention is to provide a melting chamber having a configuration which defines both a melting and a preheat zone.

Still another object of this invention is to provide a melting chamber having an inlet configuration defining a throat for metering the raw glass.

A still further object of this invention is preferably to provide a one-piece glass melting chamber to reduce further the possibility of contaminating the glass.

Another important object is to provide a glass melting chamber fabricated of refractory material in one piece.

Other objects and advantages of the invention will become more apparent during the course of the following description when taken in connection with the accompanying drawings.

In the drawings, wherein like numerals are employed to designate like parts throughout the same:

FIG. 1 is a side view in section of a one-piece glass melting chamber of refractory material made in accordance with the present invention;

FIG. 2 is a bottom plan view of the melting chamber of FIG. 1;

FIG. 3 is a fragmentary section view of a portion of the wall of the melting chamber shown in FIG. 1; and FIG. 4 is a side view in section of a melting chamber made in accordance with the present invention positioned in an environmental apparatus and adapted for the production of glass fibers.

As shown in FIG. 1 the melting chamber or crucible 10 includes a circular base 11 and upstanding side wall 12 of circular section formed integrally therewith. The side wall 12 is of generally uniform diameter for about ½ of its height, tapering slightly outwardly and upwardly from the base. The side wall then tapers inwardly at a sharp angle of about 45° for about 1/10 of its height and thence terminates in a generally cylindrical inlet throat 13 comprising about the upper ⅖ of its height.

The inlet throat 13 is approximately ½ the diameter of the base 11 of the melting chamber and has a generally uniform cylindrical wall 14 with its axis in a vertical position. The inlet throat 13 terminates at its upper end in a horizontally disposed circular opening 15 through which glass materials can be admitted to the melting chamber 10.

The base 11 of the melting chamber 10 is provided with a plurality of small apertures 16 arranged in concentric array through which molten glass formed within the melting chamber is adapted to be exuded as small molten stream 17. As shown in FIGS. 1 and 2, the apertures 16 may be formed in the base 11 of the melting chamber without any lining material therein. However, the apertures 16 can be fitted with tubular inserts 18 as shown in FIG. 3. As shown therein insert 18 includes a tubular body portion 19 terminating at its upper ends in an enlarged head 20 whereby it is adapted to be positioned with respect to the inner surface 21 of the base 11 of the melting chamber 10. The tubular body portion 19 of the insert 18 is of slightly greater length than the thickness of the base 11 and extends a short distance beyond the outer surface 22 of the base. Each of the inserts 18 is provided with a bore 23 of small diameter through which the molten glass is adapted to be exuded as a small stream 17.

In FIG. 4 a melting chamber, made in accordance with the present invention, is illustrated in an environmental apparatus for use in producing glass fibers. A refractory casing 24 is positioned in surrounding relation to the melting chamber 10. The casing 24 includes a cylindrical wall 25 and a base 26 formed integrally therewith. In the base 26, there is provided a circular opening 27. A steel shell 28 is formed in surrounding relation to the refractory 29 and is adapted to support the same. The casing 24 also includes a top 30 adapted to span the diameter of the cylindrical wall 25. A circular opening 31 is formed centrally of the top 30. The top 30, like the remainder of the refractory casing 24, also includes a steel shell element 32.

A conduit 33 is inserted through the side wall 25 of the refractory casing 24 and the steel shell 28, through which a gaseous fuel is admitted through port 33' into the casing 24 for combustion therein.

It will be understood, however, that combustion may take place externally of the casing 24, and then the heated products of combustion discharged therein.

The conduit port 33' together with the top opening 31 form means for circulating gases in an ascending path in the heating chamber 34. Positioning of the exhaust opening 31 at the top of the chamber 34 provides an arrangement whereby the heating gases are circulated from a zone corresponding to the melting zone to a zone corresponding to the preheating zone within the melting chamber 10.

The melting chamber 10 is positioned within the refractory casing 24 with its base 11 in alignment with the opening 27 of the base 26 of the casing. The base 11 of the melting chamber 10 is slightly larger than the opening 27 and thus is supported on the base 26 of the casing 24. The refractory casing 24 is of larger diameter than the melting chamber 10 to provide a combustion or heating chamber 34 wherein gases introduced by the conduit 33 may be burned for heating the melting chamber 10 and glass materials placed therein. The inlet 13 of the melting chamber 10 extends through the opening port 31 of the top 30 of the casing 24, which opening is a slightly larger diameter than the inlet to form exhaust means for withdrawing or exhausting heating gases from the combustion chamber 34.

Located in gravity feed relation above the inlet throat 13 of the melting chamber 10 there is positioned a hopper 35 having a side wall 36 and a sloping base 37 adapted to retain a bulk supply of glass marbles 38. The wall 36 is provided with an opening 39 adjacent the base 37, which is connected to a conduit 40 leading to a T-shaped feed tube 41 positioned above the inlet 13. Marbles 38 from within the hopper 35 pass by gravity downwardly through the opening 39 and thence through the conduit 40 and the T-shaped feed tube 41 to the inlet opening 15 of the melting chamber 10 for accumulation in chamber 10 and inlet throat 13. The inlet throat 13 is of sufficient diameter to permit the marbles to accumulate in a mass wherein the marbles are in vertically staggered relation with each other and occupy a cross-sectional area of at least about five times the diameter of the marbles.

Operation of the apparatus includes filling the melting chamber 10 with marbles 38 and establishing combustion in the combustion chamber 34. The heat of combustion is transmitted through the wall 12 of the melting chamber 10 and melts the marbles 38 to form a body of molten glass 42. The level of the molten glass stabilizes at about the lower terminus 43 of the inlet throat 13. Marbles 38 in various stages of melting are substained in floating relation on top of the molten glass 42 and preferably in columnar form whereby any gases within the receptacle may ascend through the column and assist in preheating the marbles. As molten glass is withdrawn from the melting chamber additional marbles from the hopper are automatically admitted to the melting chamber. Thus the present structure provides an automatic and self-contained marble feeding and metering device which is devoid of moving parts.

The molten glass 42 exudes through the apertures 16 in the base 11 of the melting chamber 10 as a plurality of small streams 17 which are drawn out into fibers 44. It will be noted that the opening 27 in the base 26 of the refractory casing 24 and the base 11 of the melting chamber 10 are of such configuration and relation with respect to each other as to allow clearance for passage of the fibers 44 freely downwardly.

Melting chambers of the present invention may be made from a number of refractory materials such as refractory clay, sillimanite, mullite, as a high-alumina refractory. A primary requirement of the material of which the melting chamber is made is that it have a very low coefficient of expansion. This will prevent strains and fractures from being developed in the melting chamber during operation. The melting chamber is suitably made by a slip casting process typical of that used for making pottery vases, employing a split mold.

The inserts utilized in the apertures provided in the bottom of the melting chamber can be made from a variety of heat resistant metals. For example, platinum alloys can be used, as for example a platinum-rhodium alloy. Also stainless steel can be utilized. One typical stainless steel alloy which may be used is known in the trade as Inconel (trademark) and comprises approximately 77% nickel, 15% chromium and 7% iron, the other 1% comprising various impurities.

Ordinarily the diameter of the inlet throat 13 is about 5 times the diameter of a marble. Since marbles are made conventionally of a diameter of ¾ inch, this means that the inside diameter of the inlet throat is approximately 3.75 inches. This specific diameter is arrived at by making allowance for a row of marbles to fuse to the inside wall of the inlet and thus leave a passage down the center thereof. Melting chambers made in accordance with the present invention may therefore have a base dimension of 3.75 inches to about 20 inches with an inlet throat diameter of approximately 3.75 to 4 inches. Thus the ratio of the diameter of the inlet throat to the diameter of the base can vary between about 1:1 and about 1:5. The wall of the melting chamber may extend upwardly and outwardly in the concentric array and thence taper inwardly to the tapered inlet, or taper gradually inwardly from the base to the inlet throat.

It will be noted that a melting chamber, having a configuration as described, when combined with an outer casing provides a heating chamber 34 wherein the hottest products of combustion are directed to the bulk of the work, or first zone, to be heated and that subsequently the somewhat cooled products of combustion are directed contiguously to the area of the melting chamber of reduced cross-section defining an elongated preheat or second zone 14, superjacent to said first zone, where less heat is required. The restricted inlet throat also tends to confine the hot air within the melting chamber to the melting zone or area. Such arrangement makes the most efficient use of the heat available from the hot products of combustion.

As mentioned above a number of advantages accrue from one-piece melting chambers made in accordance with the present invention. It will be understood however, that some of the advantages will also accrue from a melting chamber formed of more than one piece, if the general overall configuration of the above described chamber or crucible is maintained. An important advantage is the ready availability of refractory materials and their ease of fabrication by a readily controllable slip casting process. Further the structure of the present invention embodies a self-sustaining and automatic marble metering and feed element which is devoid of moving parts. Further the melting chambers of the present invention provide improved economy of operation by the fact that they can be heated by burning gases which of course are appreciably cheaper than other sources of heat, such as electricity.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. In apparatus for the production of glass fibers from glass marbles, the combination comprising: a glass melting crucible of refractory material having a circular base with a diameter in the range from 3.75 to 20 inches and an upstanding side wall formed integrally therewith, said side wall having a generally uniform diameter for about ½ of its height, tapering slightly outwardly and upwardly from the base, then tapering inwardly at an angle of about 45° for about 1/10 of its height and thence terminating in a generally cylindrical inlet throat comprising approximately the upper ⅖ of its height and wherein the throat has a diameter of approximately ½ of the base, said base having a plurality of apertures therein positioned in circular array through which molten glass formed within said crucible is exuded as small streams; a bulk marble supply receptacle positioned in gravity feed relation with respect to the inlet opening of the glass melting crucible; passage means connecting said supply receptacle and said cylindrical throat of said glass melting crucible in free flow marble-feeding relation; a refractory casing positioned in surrounding relation to the glass melting crucible and including a cylindrical wall, a base formed integrally therewith and a top, the base of the casing having an opening therein over which the base of the glass melting crucible is positioned, and the top having a circular opening formed through which the throat of the melting crucible extends, said opening in the top of the refractory casing being of slightly larger diameter than the throat of the melting crucible, said refractory casing being of larger diameter than said melting crucible to provide a heating space wherein heated products of combustion are introduced; and port means in said casing supplying heated products of combustion to said heating space adjacent to the external face of said side wall of said crucible.

2. In apparatus wherein glass is rendered molten for attenuation into fibers, including a crucible for melting glass and being in spaced relation with an outer casing to define a heating chamber therebetween into which chamber heating gases are supplied, the improvement wherein: said crucible is of refractory clay material and and is adapted to melt glass marbles of a preselected diameter, said crucible comprising, a base portion defining a plurality of apertures for exuding molten glass, said base portion having a diameter greater than said preselected diameter of said marbles; a lower side wall portion extending generally upright from said base; an upper side wall portion defining and inlet throat having a diameter at least about five times the diameter of said marbles but less than the diameter of said lower side wall portion, so as to be adapted to contain an accumulated mass of said marbles and define a preheat zone through which marbles may gravitate even though some marbles may fuse to the inside of the inlet throat; said upper side wall portion also having a length greater than its thickness; and an intermediate wall portion forming a transition between said lower and upper side wall portions.

3. A method of rendering glass marbles of preselected diameter molten prior to attenuation into fibers, which comprises: continuously supplying a source of marbles to a melting crucible of refractory clay material positioned within an outer casing, said crucible and said outer casing being in spaced relation and defining therebetween a heating chamber, said crucible also having an elongated inlet throat portion, accumulating said marbles in the inlet throat portion in a mass occupying a cross-sectional area having a diameter at least about five times the preselected diameter of said marbles; heating a first portion, subjacent to said throat portion, of said crucible with heated products of combustion to melt the glass in said first portion; circulating said products of combustion from the area in said heating chamber contiguous to said first portion to an area of said chamber contiguous to said throat portion to preheat the mass of marbles accumulated in said throat portion prior to melting; and exhausting said products of combustion.

4. A method of producing glass fibers from glass marbles, comprising in combination: providing a source of glass marbles including a column thereof in free flow gravitational marble feeding relation with respect to a refractory clay crucible positioned within an outer casing, said crucible and said outer casing being in spaced relation and defining therebetween a heating chamber, said crucible having an inlet throat portion with an internal diameter substantially greater than the diameter of the marbles being fed; feeding said marbles by way of said column gravitationally to said crucible through said inlet throat portion, filling said crucible with said marbles, and accumulating them in said inlet throat portion in a mass wherein said marbles are in vertically staggered relation with each other within said throat portion and occupy a cross-sectional area of said throat portion having a diameter at least about five times the diameter of said marbles, said mass of marbles and the feed end of said column of marbles being in marble-to-marble contact, whereby the gravitational feeding of the marbles is controlled in accordance with the melting of the marbles and their movement through said throat portion is facilitated even though some marbles may fuse to the inside surface of said throat portion; applying heating gases to said crucible to melt marbles therein in a first zone subjacent to said throat portion and form a body of molten glass having marbles floating thereon and supporting said mass of marbles in said throat portion; circulating said heating gases from said first zone to a second zone contiguous to said throat portion to preheat said marbles therein; and removing molten streams of glass through the bottom of said crucible and thereby causing additional marbles to be automatically and gravitationally feed by way of said column into said throat portion at a rate commensurate with the rate of withdrawal of molten glass from said crucible and the corresponding movement of marbles through said throat portion.

References Cited in the file of this patent

UNITED STATES PATENTS

| | | |
|---|---|---|
| 1,796,571 | Mathieu | Mar. 17, 1931 |
| 2,244,777 | Hood | June 10, 1941 |
| 2,286,653 | Siegfried | June 16, 1942 |
| 2,286,903 | Dockerty | June 16, 1942 |
| 2,331,946 | Von Pazsiczky et al. | Oct. 19, 1943 |
| 2,482,071 | Simison | Sept. 13, 1944 |
| 2,453,864 | Schlehr | Nov. 16, 1948 |
| 2,596,272 | Moravec | May 13, 1952 |
| 2,747,006 | Barnard | May 22, 1956 |
| 2,814,657 | Labino | Nov. 26, 1957 |
| 2,875,893 | Russell et al. | Mar. 3, 1959 |
| 2,974,359 | Van der Hoven | Mar. 14, 1961 |
| 2,994,916 | McFadden | Aug. 8, 1961 |
| 3,013,361 | McFadden | Dec. 19, 1961 |

FOREIGN PATENTS

| | | |
|---|---|---|
| 1,008,738 | France | Feb. 27, 1952 |
| 483,080 | Canada | May 6, 1952 |